(12) United States Patent
Hasselgren et al.

(10) Patent No.: US 9,418,471 B2
(45) Date of Patent: Aug. 16, 2016

(54) COMPACT DEPTH PLANE REPRESENTATION FOR SORT LAST ARCHITECTURES

(71) Applicant: Intel Corporation, Santa Clara, CA (US)

(72) Inventors: Jon N. Hasselgren, Bunkeflostrand (SE); Magnus Andersson, Helsingborg (SE)

(73) Assignee: Intel Corporation, Santa Clara, CA (US)

( * ) Notice: Subject to any disclaimer, the term of this patent is extended or adjusted under 35 U.S.C. 154(b) by 163 days.

(21) Appl. No.: 14/217,774

(22) Filed: Mar. 18, 2014

(65) Prior Publication Data

US 2015/0269771 A1 Sep. 24, 2015

(51) Int. Cl.
*G06T 15/00* (2011.01)
*G06T 15/40* (2011.01)

(52) U.S. Cl.
CPC ............. *G06T 15/405* (2013.01); *G06T 15/005* (2013.01); *G06T 2200/12* (2013.01); *G06T 2200/32* (2013.01); *G06T 2207/20016* (2013.01)

(58) Field of Classification Search
USPC ........................................................ 345/422
See application file for complete search history.

(56) References Cited

PUBLICATIONS

Hasselgren, J., et al., "Efficient depth buffer compression." SIGGRAPH/Eurographics Conference on Graphics Hardware: Proceedings of the 21 st ACM SIGGRAPH/Eurographics symposium on Graphics hardware: Vienna, Austria. (2006), vol. 3. No. 04, p. 103-110 (8 pages).

*Primary Examiner* — Kimbinh T Nguyen
(74) *Attorney, Agent, or Firm* — Trop Pruner & Hu, P.C.

(57) ABSTRACT

In accordance with some embodiments, a full per sample coverage mask may be used for a subset of the pixels in the tile, thereby enabling pixels that belong to multiple depth ranges to be handled. This makes the depth bounds a tighter fit for the true depth range of the tile and improves hierarchical depth culling efficiency when MSAA is used.

27 Claims, 6 Drawing Sheets

COMPACT DEPTH PLANE REPRESENTATION FOR SORT LAST ARCHITECTURES

BACKGROUND

This relates generally to graphics processing and, specifically, to occlusion culling.

Culling means "to remove from flock," and in graphics, it boils down to removing work that does not alter the final image. This includes, for example, view frustum culling, where objects that are outside the view frustum are not further processed, since they will not affect the final image.

In maximum depth culling, often called hierarchical occlusion culling, the maximum depth, $z_{max}$, of a tile is stored and maintained per tile. If the estimated conservative minimum depth of a triangle inside a tile is greater than the tile's $z_{max}$, then the triangle is completely occluded inside that tile. In this case, the per-sample depth values do not need to be read from memory, and no further processing is needed within the tile for that triangle. This technique is sometimes called $z_{max}$-culling. In addition, one may also store the minimum depth, $z_{min}$, of the depths in a tile, and avoid depth reads if a triangle fully covers a tile, and the triangle's estimated conservative maximum depth is smaller than the $z_{min}$, in which case the triangle will overwrite all depths in the tile (assuming no alpha/stencil test etc).

The $z_{max}$ is computed from the per-sample depths in a tile. Ideally, the $z_{max}$-value of a tile should be recomputed every time a depth whose value is $z_{max}$ is overwritten.

A depth culling unit stores the $z_{max}$-representation, which may be accessed through a cache, for example. A tile may hold plane equations from the triangle that covers the tile, and for subsequent triangles culling can be done immediately against that representation (either against the evaluated depths from the plane equations, or by computing $z_{max}$ of the plane equations inside the tile). When the tile can no longer maintain this representation, due to storage requirements or other criteria, the plane equations may be replaced by one or many $z_{min}$- and $z_{max}$-values for the entire tile, or for subtile regions of the tile. For example, an 8×8 tile could hold two $z_{min}$ and two $z_{max}$ for each of the 4×8 subtile regions. Unless a feedback is used, sending computed $z_{max}$ values back from the depth buffer unit to the hierarchical occlusion culling unit, the $z_{max}$-values needs to be conservatively updated and will in general stay the same, unless an entire subtile is fully covered by a triangle.

Multi-sampled anti-aliasing (MSAA) is a type of supersampling. Generally, the renderer evaluates a fragment program, once per pixel, and only truly supersamples the depth and stencil values. In general, multi-sampling refers to a special case of supersampling where only some components of the final image are not fully supersampled.

Anti-aliasing is any technique to combat aliasing in a sampled signal to smooth images rendered by computer generated imagery. Attempts to overcome jaggies which are stair step like lines that should have been smooth.

BRIEF DESCRIPTION OF THE DRAWINGS

Some embodiments are described with respect to the following figures.

DETAILED DESCRIPTION

In accordance with some embodiments, reduced precision may be used when storing depth plane values for partially covered tiles while using full precision for fully covered tiles. However, the reduced precision is only used if the reconstructed depth values are identical to what would have been produced using a full precision depth plane in one embodiment. This allows the use of a depth plane representation with fewer bits in most cases, thereby freeing up bits for storing additional information such as coverage masks or additional depth planes. This allows more tiles to be represented in the depth culling unit, thereby reducing depth buffer bandwidth in some embodiments.

Figure 1:
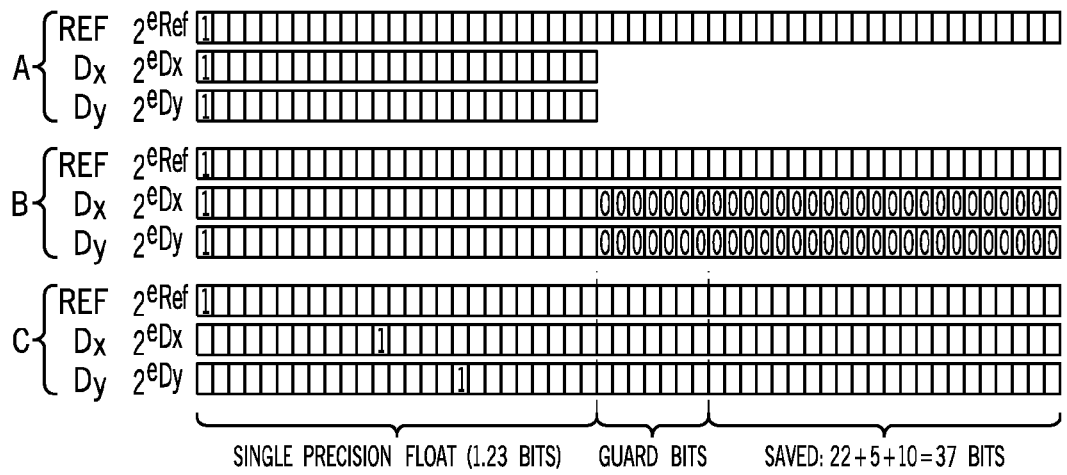
FIG. 1 is a depiction showing how depth values are recreated from a plane equation according to one embodiment.

Depth plane equations (Ref, $D_x$, $D_y$) may be represented in a high precision floating point format. When the depth value of a sample is evaluated, the plane equation is evaluated as $z(x,y)=\text{Ref}+x \cdot D_x+y \cdot D_y$, where $(x,y)$ is the sample coordinate. All computations are performed in the internal high precision format similar to IEEE double precision float and the result is finally rounded to a single precision (32 bit) IEEE float value. If a tile (typically an 8×4 rectangle of pixels) is determined to be completely covered by a triangle, it may be stored in plane equation form. Since the plane equation is enough to recreate the depth values of all samples exactly, the depth buffer is not updated, saving bandwidth each time a tile can be stored in plane mode. An alternative lower precision plane equation may be used as long as the depth values evaluated for all (covered) samples are identical to the depth values used with the higher precision plane equation, after rounding to single precision float depths. FIG. 1 (A-C) is an example of how a depth value is computed.

In the plane equation, the deltas, $(D_x, D_y)$ are typically stored in 32-bit single precision and the reference value is stored in higher precision as shown in FIG. 1A. The deltas are then converted to the higher precision format as shown in FIG. 1B. Finally, when the depth value is composited, the reference value and deltas are normalized to the same exponent by shifting mantissas, as shown in FIG. 1C, and finally added together to composite the final depth value. Only the upper 23 bits remain after the final conversion to floating point, and the remaining bits are only used to ensure correct rounding. In a compacted plane representation, in addition to storing the upper 23 bits, a number of guard bits are used to ensure correct result after rounding. The number of guard bits required to ensure correct rounding varies based on per-sample depth data and can be difficult to compute. As an optimization, one may start from the allowed bit-budget of a compressed tile and subtract storage needed for all other data. This directly gives the guard bits available within the current budget, and then one may test if the compacted representation ensures the correct result after rounding. Typically, the deltas have much smaller exponents than the reference value, and therefore, the mantissa bits of the deltas that fall outside the guard bits range may be omitted. An example is illustrated in FIG. 10.

FIG. 1 illustrates how depth values are re-created from the plane equation. The example illustrates re-creating the depth value $z(1,1)=\text{Ref}+D_x+D_y$. FIG. 1A shows the original plane equation. The deltas, $(D_x, D_y)$ are stored in 32-bit single precision and the reference value is stored in higher precision (e.g. 64 bits). In FIG. 1B, the delta values are converted to the same high precision format as the reference value. In FIG. 10, the exponents are normalized. All values are represented with the same exponent and the mantissas are shifted accordingly. Only the upper 23) bits remain after the final conversion to single precision float. In addition, a number of extra guard bits are stored to ensure a correct result after rounding. The bits falling to the right of the guard bits' border can be removed saving a total of 37 bits in this example.

Most tiles are representable with 6-12 guard bits. The actual number of saved bits depend on the relative exponents of Ref, $D_x$, and $D_y$, and typically varies between 10 and 60 for relevant workloads. The saved bits may be used to store additional data including but not limited to: use a compressed coverage mask, encode two planes overlapping a single tile, store additional min/max values or data aiding culling of the regions not covered by the triangle.

The values of the plane equation received from the rasterizer are evaluated to determine a compact representation for the signs and exponent values. Then, it is determined if the per-sample coverage mask can be compressed using either horizontal or vertical breaks, which is a compressed bit-mask representation described in detail later. Since the bit budget is typically very tight, a configuration with one or two pixel horizontal breaks, or one pixel vertical break may be used. After storing signs, exponents, and the compressed per-sample coverage mask, the remaining bits may be used for encoding the lower precision mantissa bits of the depth plane equation. A simple equation is solved to determine how many guard bits can be spent on the mantissas of Ref, $D_x$, and $D_y$. Then the precision is reduced by rounding them to the allowed number of bits, similar to FIG. 1C, giving us lower precision values $\widehat{Re}$ f, $\widetilde{D_x}$ and $\widetilde{D_y}$.

Figure 2:
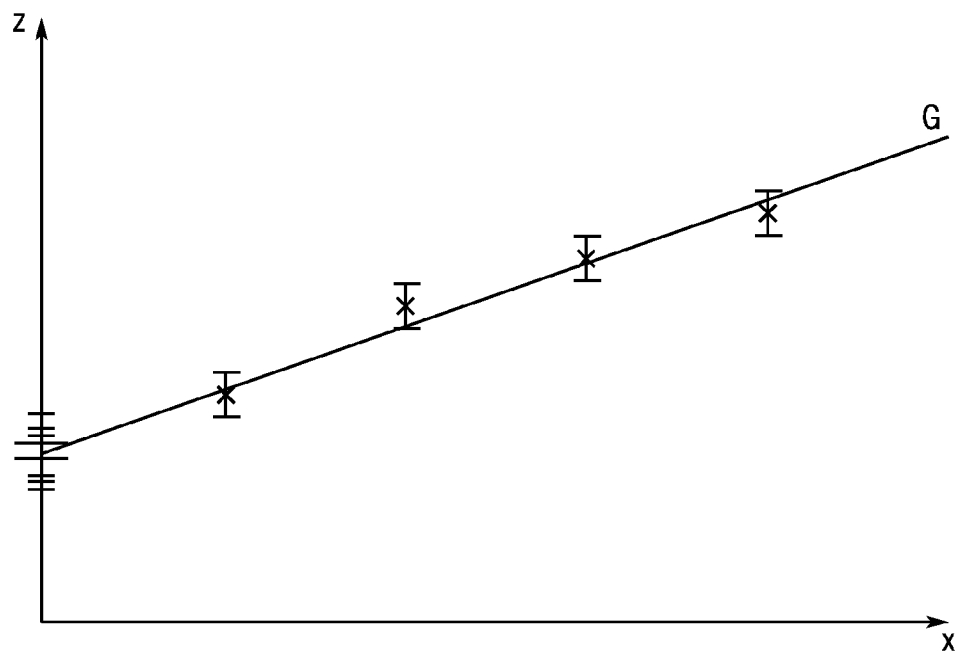
FIG. 2 is a graph of a plane equation for one embodiment.

The exact plane equation (line G in FIG. 2) is evaluated at given samples, and rounded to float (the crosses in FIG. 2). An interval of full precision values, $\hat{z}=[\underline{z},\overline{z}]$, that would all round to the given sample's 32-bit depth value are computed. These intervals are back projected to the reference point (x=0) using the reduced precision deltas, to obtain an interval $\widehat{Re}$ f of possible reference values, where the back projection is given by $$\widehat{Re} f=[\underline{Ref},\overline{Ref}]=\hat{z}-x\cdot\tilde{D}_x-y\cdot\tilde{D}_y=[\underline{z}-x\cdot\tilde{D}_x-y\cdot\tilde{D}_y,\overline{z}-x\cdot\tilde{D}_x-y\cdot\tilde{D}_y].$$

A final possible interval may be computed by taking the maximum of all samples' $\underline{Ref}$, ceiled to the nearest quantized value for the lower precision representation (dictated by how many guard bits one can afford) and the minimum of $\overline{Ref}$, floored to nearest quantized value. The tile is representable if the interval is not empty, $\underline{Ref}<\overline{Ref}$, and in such a case one may pick $\widetilde{Re}$ f as any quantized value in $\widehat{Re}$ f. If the tile is not compressible, then some other representations, such as $z_{max}$ mode may be used and all depth values are sent to backend z for further processing. The method for adapting the plane equation described herein only adapts the $\widetilde{Re}$ f value. However, it is possible to tune all the values ($\widetilde{Re}$, $\widetilde{D_x}$, $\widetilde{D_y}$) in the plane equation, potentially allowing more tiles to be compressed, but at a greater computational cost.

Figure 3:
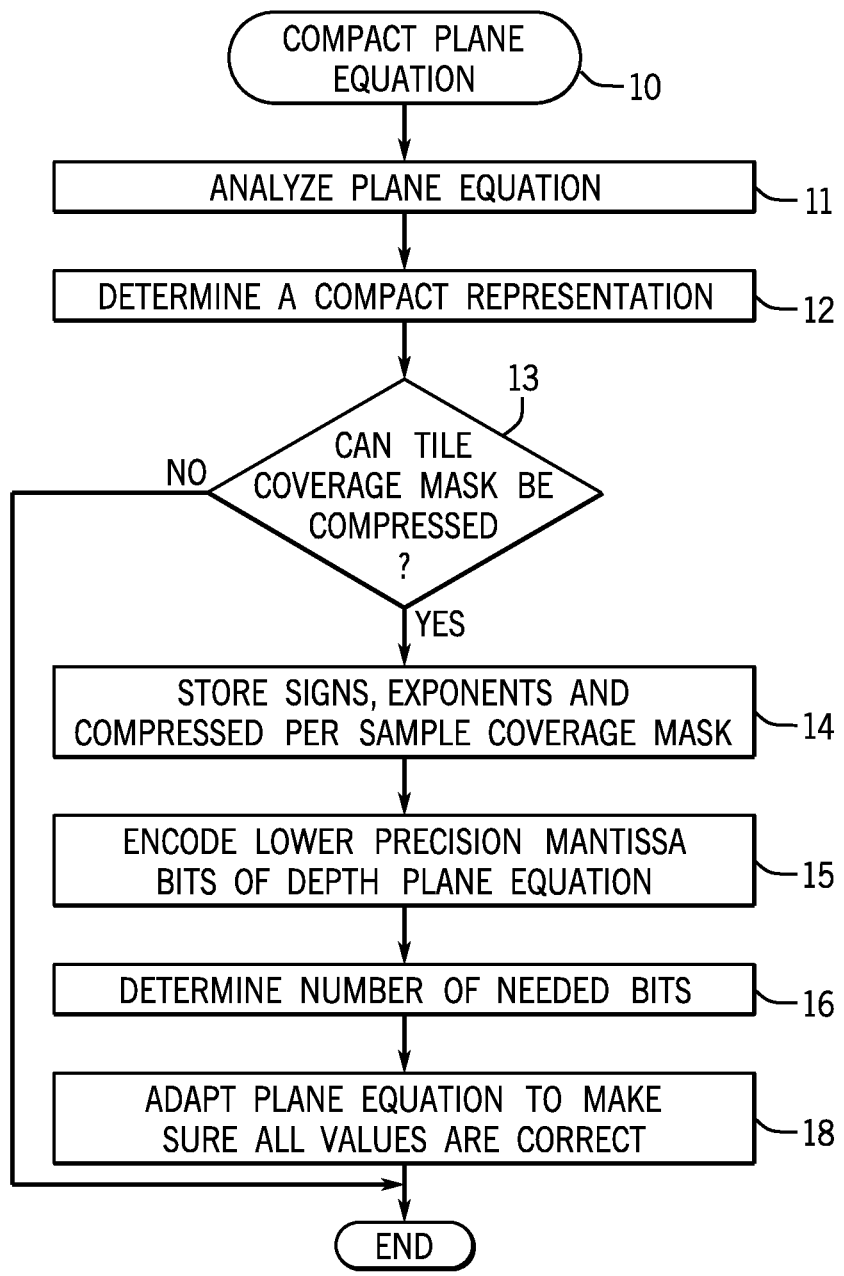
FIG. 3 is a flow chart for one embodiment.

Referring to FIG. 3, compact plane equation sequence 10 may be implemented in software, firmware and/or hardware. In software and firmware embodiments, it may be implemented by computer executed instructions stored in one or more non-transitory computer readable media such as magnetic, optical or semiconductor storages.

The sequence begins as indicated at block 11 by analyzing the plane equation to determine a compact representation for the signs and exponent values as indicated in block 12. Then it is determined if the per sample coverage mask can be compressed as indicated at diamond 13.

Next the signs, exponents and compressed per sample coverage mask are stored as indicated in block 14. Lower precision mantissa bits of the depth plane equation are encoded as indicated in block 15.

The number of needed guard bits can be spent on mantissas can be determined as indicated in block 16. Finally the exact plane equation is adapted to make sure that all the values are correct as indicated in block 18.

Figure 4:
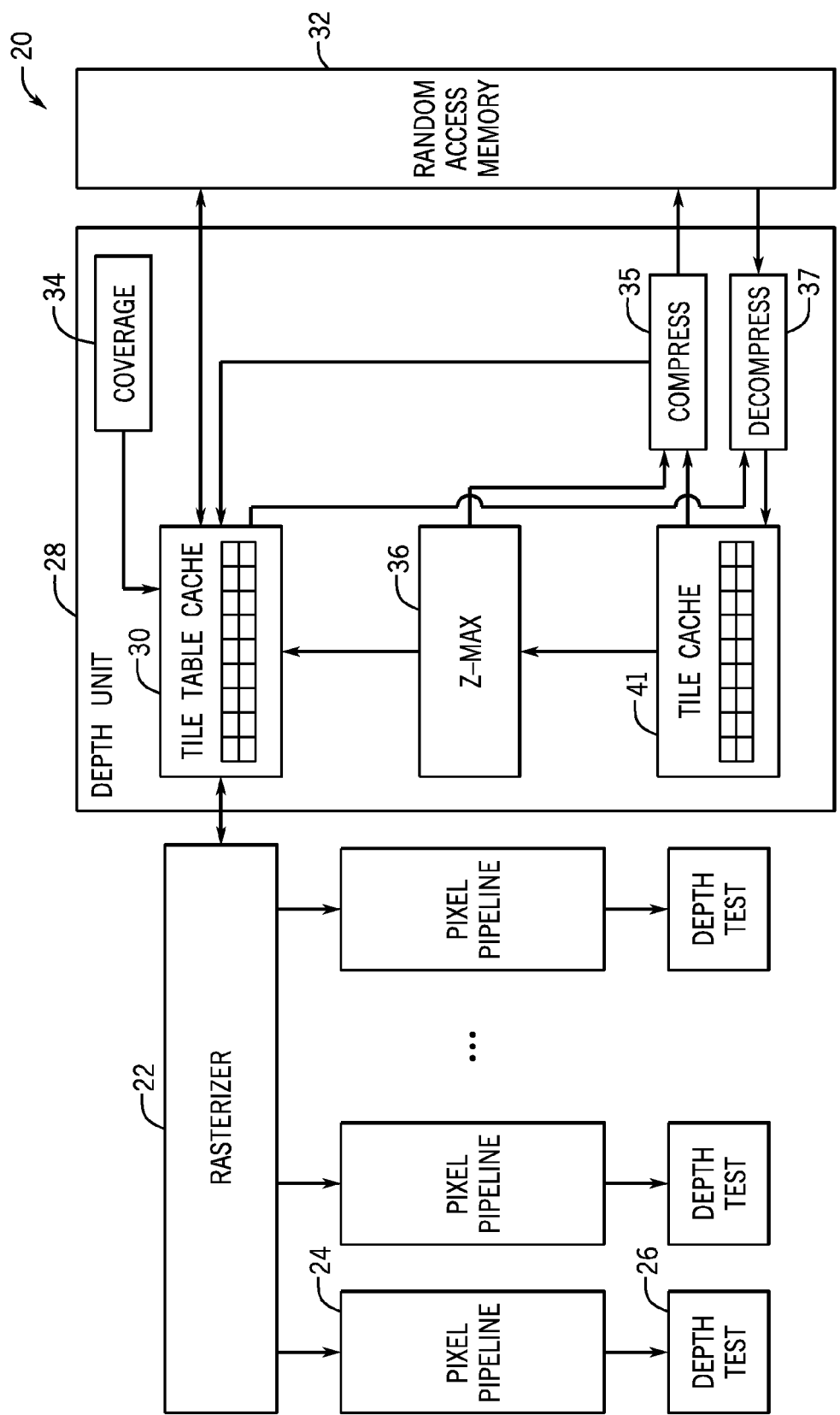
FIG. 4 is a schematic depiction for one embodiment.

Referring to FIG. 4, a depth buffer architecture 20 includes a rasterizer 22 to identify which pixels lie within the triangle currently being rendered. In order to maximize memory coherency for the rest of the architecture, it is often beneficial to first identify which tiles (a collection of W×H pixels) overlap the triangle. When the rasterizer finds a tile that partially overlaps the triangle, it distributes the pixels in that tile over a number of pixel pipelines 24. The purpose of each pixel pipeline is to compute the depth and color of a pixel. Each pixel pipeline contains a depth test unit 26, responsible for discarding pixels that are occluded by the previously drawn geometry. The depth unit 28 includes a memory 32, in one embodiment, that is a random access memory. It also includes a tile table cache 30 temporarily storing the $z_{max}$-mask representation for each tile and backed by the memory 32, a tile cache 41 which is also backed by the memory 32 and temporarily stores per-sample depth values for rapid access, optionally a $z_{max}$-feedback computation 36 which updates the $z_{max}$ representation in the tile table 30 each time a tile is evicted from the tile cache 41, a compressor 35, and a decompressor 37, as well as a coverage mask buffer 34. The tile table cache stores the $z_{max}$ representation and header information, for example one or more flags indicating which compression algorithm is used to compress a tile of depth values, separately from the depth buffer data.

The compressor 35, in general, compresses the tile depth values to a fixed bit rate and fails if it cannot represent the tile in a given number of bits without information loss. When writing a depth tile to memory, the compressor with the lowest bit rate is typically selected that succeeds in compressing the tile without excessive information being lost. The flags in the tile table are updated with an identifier unique to that compressor and compressed data is written to memory. When a tile is read from memory, the compressor identifier is read from the tile table and the data is decompressed using the corresponding decompression algorithm 37. A buffer 34 may store the coverage mask as well.

The mask algorithm used to compact the partial coverage mask, which may be stored in the saved bits, operates as follows. First, assume that each pixel-row in a tile is comprised of contiguous regions of pixels either fully covered or fully not covered, henceforth called a "solid region", and store the mask of such regions using one bit only. Each solid region is separated by a "break region", which is a region where a bit is stored for every sample to indicate whether it is covered. After each break, an additional bit is stored to indicate if the following solid region that it belongs is covered.

In some embodiments, different configurations may be used for the breaks. For example, a single two pixel wide break may be supported for each row within the desired bit budget. Another alternative is to support two independent breaks, where the breaks are only one pixel wide, giving fewer pixels but greater flexibility in where the pixels are positioned. In practice, best performance is gained by testing a few different break configurations while compressing, picking the one that fits within the least number of bits, and storing a few header bits to indicate which configuration was used for a particular tile.

The process of finding the solid regions and the break regions may be implemented as follows. First, a variable L equal to the coverage mask of the first sample in the first pixel is set. Then the sequence scans over all samples in all pixels, for example from left to right. Once a sample with a coverage mask that differs from L is found, the enclosing pixel is marked as a break B. After explicitly storing mask bits for all samples in all pixels in the break region (starting from B and stretching over a number of pixels), L is reinitialized to be the mask bit of the first sample in the first pixel after the break region, followed by an iterative search for the next break. The mask is not compressible any row requires more breaks than allowed by the configuration.

It is also possible to swap axes and specify the breaks for vertical columns. Another variant to searching for breaks in column or in row order, is to have other space filling curves that fully or partially cover the tiles such as Hilbert or Morton curves. Nothing needs to be altered in these cases and the pixel order may be implicit from the mode. Furthermore, it is possible to assume that all solid regions to the left or right of the break region belong to the same $z_{max}$ layer. For the scenarios where this is common, a mode can be used where the layer information can be encoded in a single bit.

Figure 5:
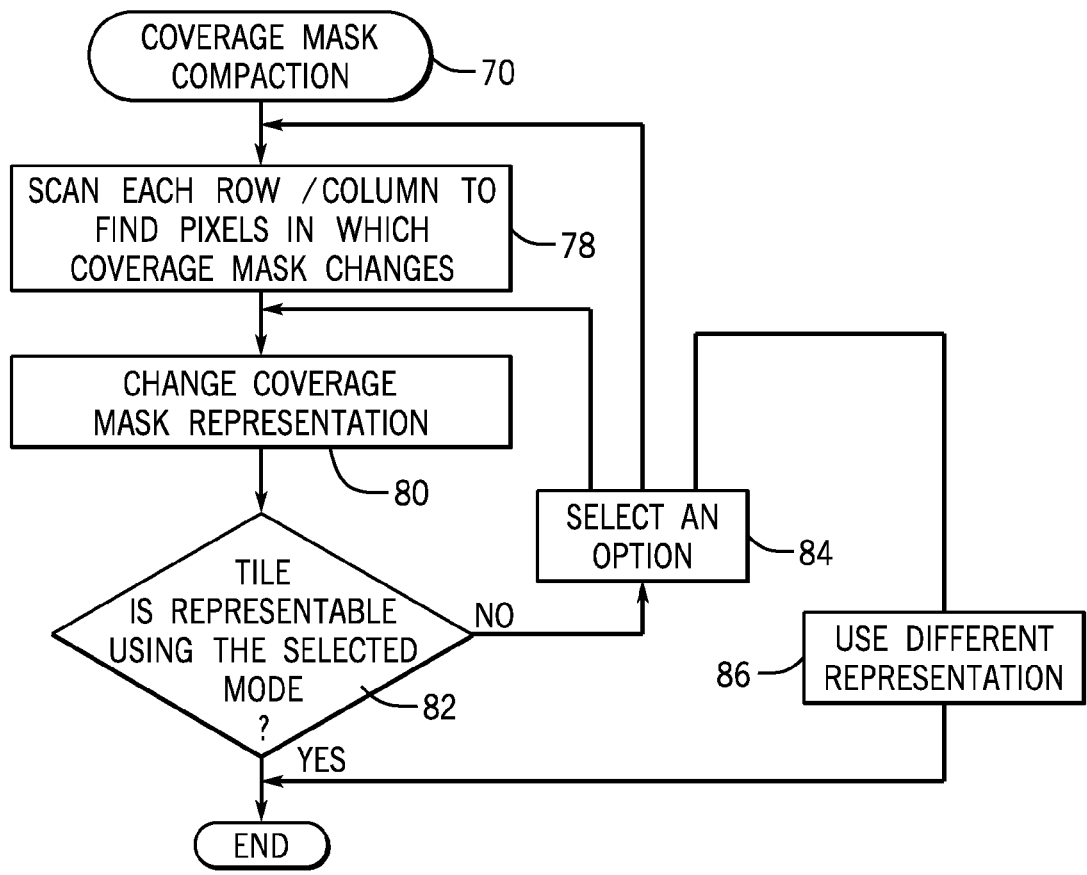
FIG. 5 is a flow chart for another embodiment.

In accordance with some embodiments, a coverage mask compaction sequence 70 shown in FIG. 5 may be implemented in software, firmware and/or hardware. In software and firmware embodiments it may be implemented by computer executed instructions stored in one or more non-transitory computer readable media such as a semiconductor, magnetic or optical storage. In one embodiment, the random access storage 32 may be used for this purpose as shown in FIG. 4.

The sequence 70, shown in FIG. 5, begins by scanning each row/column to find the pixels in which a coverage mask changes as indicated in block 78. These are the pixels that need to be represented with a per-sample mask. Next the coverage mask representation is changed (block 80) as described above.

A check at diamond 82 determines if the tile is not representable using the selected mode. If it is not, then an option must be selected at block 84. One option is to go back to block 78 using a different row/column orientation. Another option is to go back to block 80 with a different parameter setting. If no more variants are available, then another representation such as the original, per pixel $z_{max}$ mode or some other representation must be used as indicated in block 86.

Figure 6:
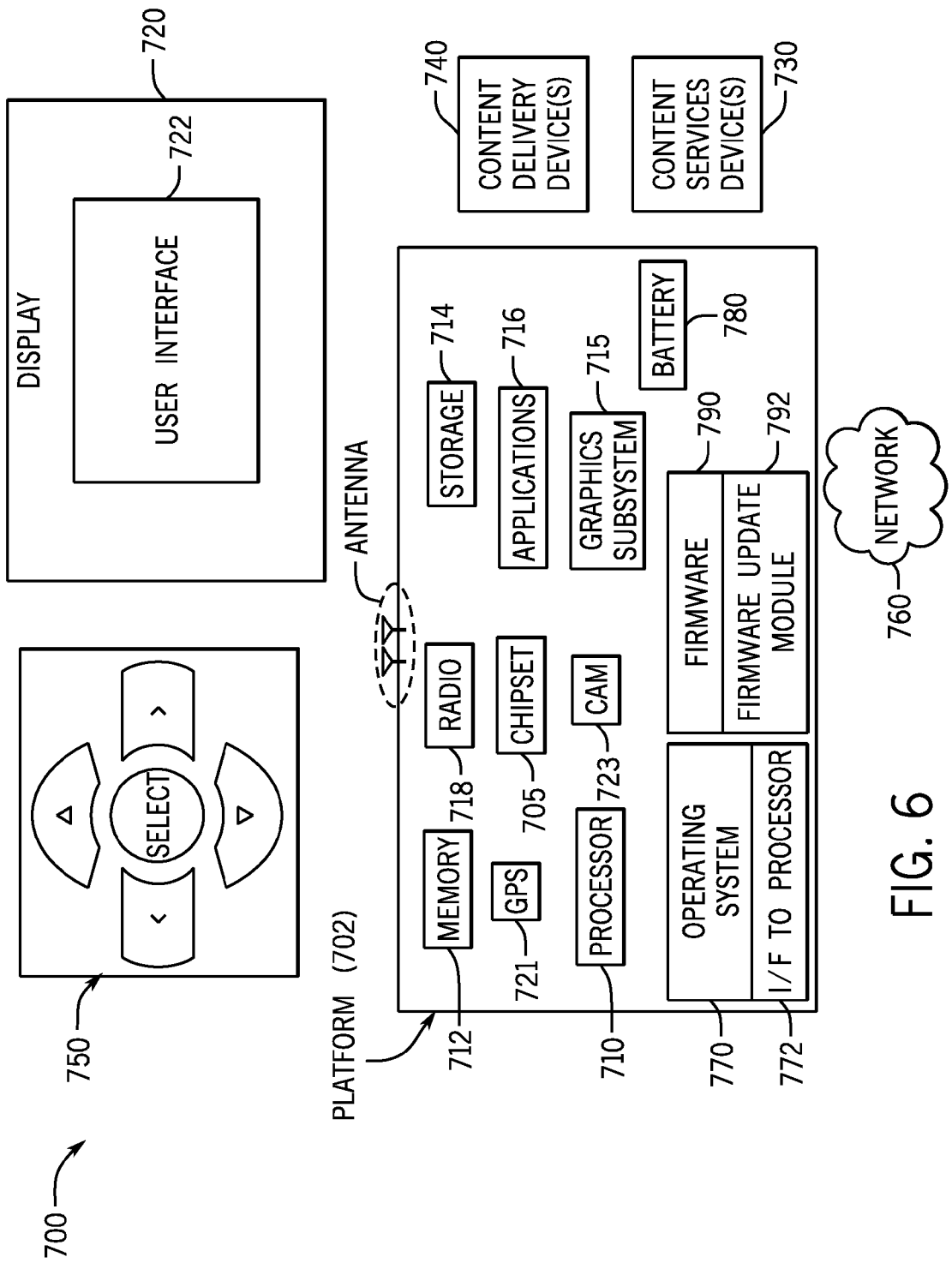
FIG. 6 is a system depiction according to one embodiment.

FIG. 6 illustrates an embodiment of a system 700. In embodiments, system 700 may be a media system although system 700 is not limited to this context. For example, system 700 may be incorporated into a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

In embodiments, system 700 comprises a platform 702 coupled to a display 720. Platform 702 may receive content from a content device such as content services device(s) 730 or content delivery device(s) 740 or other similar content sources. A navigation controller 750 comprising one or more navigation features may be used to interact with, for example, platform 702 and/or display 720. Each of these components is described in more detail below.

In embodiments, platform 702 may comprise any combination of a chipset 705, processor 710, memory 712, storage 714, graphics subsystem 715, applications 716 and/or radio 718. Chipset 705 may provide intercommunication among processor 710, memory 712, storage 714, graphics subsystem 715, applications 716 and/or radio 718. For example, chipset 705 may include a storage adapter (not depicted) capable of providing intercommunication with storage 714.

Processor 710 may be implemented as Complex Instruction Set Computer (CISC) or Reduced Instruction Set Computer (RISC) processors, x86 instruction set compatible processors, multi-core, or any other microprocessor or central processing unit (CPU). In embodiments, processor 710 may comprise dual-core processor(s), dual-core mobile processor(s), and so forth. The processor may implement the sequences of FIGS. 3 and 5 together with memory 712. These sequences may be performed in some embodiments by a graphics processor of the graphics subsystem 715.

Memory 712 may be implemented as a volatile memory device such as, but not limited to, a Random Access Memory (RAM), Dynamic Random Access Memory (DRAM), or Static RAM (SRAM).

Storage 714 may be implemented as a non-volatile storage device such as, but not limited to, a magnetic disk drive, optical disk drive, tape drive, an internal storage device, an attached storage device, flash memory, battery backed-up SDRAM (synchronous DRAM), and/or a network accessible storage device. In embodiments, storage 714 may comprise technology to increase the storage performance enhanced protection for valuable digital media when multiple hard drives are included, for example.

Graphics subsystem 715 may perform processing of images such as still or video for display. Graphics subsystem 715 may be a graphics processing unit (GPU) or a visual processing unit (VPU), for example. An analog or digital interface may be used to communicatively couple graphics subsystem 715 and display 720. For example, the interface may be any of a High-Definition Multimedia Interface, DisplayPort, wireless HDMI, and/or wireless HD compliant techniques. Graphics subsystem 715 could be integrated into processor 710 or chipset 705. Graphics subsystem 715 could be a stand-alone card communicatively coupled to chipset 705.

The graphics and/or video processing techniques described herein may be implemented in various hardware architectures. For example, graphics and/or video functionality may be integrated within a chipset. Alternatively, a discrete graphics and/or video processor may be used. As still another embodiment, the graphics and/or video functions may be implemented by a general purpose processor, including a multi-core processor. In a further embodiment, the functions may be implemented in a consumer electronics device.

Radio 718 may include one or more radios capable of transmitting and receiving signals using various suitable wireless communications techniques. Such techniques may involve communications across one or more wireless networks. Exemplary wireless networks include (but are not limited to) wireless local area networks (WLANs), wireless personal area networks (WPANs), wireless metropolitan area network (WMANs), cellular networks, and satellite networks. In communicating across such networks, radio 718 may operate in accordance with one or more applicable standards in any version.

In embodiments, display 720 may comprise any television type monitor or display. Display 720 may comprise, for example, a computer display screen, touch screen display, video monitor, television-like device, and/or a television. Display 720 may be digital and/or analog. In embodiments, display 720 may be a holographic display. Also, display 720 may be a transparent surface that may receive a visual projection. Such projections may convey various forms of information, images, and/or objects. For example, such projections may be a visual overlay for a mobile augmented reality (MAR) application. Under the control of one or more software applications 716, platform 702 may display user interface 722 on display 720.

In embodiments, content services device(s) 730 may be hosted by any national, international and/or independent service and thus accessible to platform 702 via the Internet, for example. Content services device(s) 730 may be coupled to platform 702 and/or to display 720. Platform 702 and/or content services device(s) 730 may be coupled to a network 760 to communicate (e.g., send and/or receive) media information to and from network 760. Content delivery device(s) 740 also may be coupled to platform 702 and/or to display 720.

In embodiments, content services device(s) 730 may comprise a cable television box, personal computer, network, telephone, Internet enabled devices or appliance capable of delivering digital information and/or content, and any other similar device capable of unidirectionally or bidirectionally communicating content between content providers and platform 702 and/display 720, via network 760 or directly. It will be appreciated that the content may be communicated unidirectionally and/or bidirectionally to and from any one of the components in system 700 and a content provider via network 760. Examples of content may include any media information including, for example, video, music, medical and gaming information, and so forth.

Content services device(s) 730 receives content such as cable television programming including media information, digital information, and/or other content. Examples of content providers may include any cable or satellite television or radio or Internet content providers. The provided examples are not meant to limit embodiments of the invention.

In embodiments, platform 702 may receive control signals from navigation controller 750 having one or more navigation features. The navigation features of controller 750 may be used to interact with user interface 722, for example. In embodiments, navigation controller 750 may be a pointing device that may be a computer hardware component (specifically human interface device) that allows a user to input spatial (e.g., continuous and multi-dimensional) data into a computer. Many systems such as graphical user interfaces (GUI), and televisions and monitors allow the user to control and provide data to the computer or television using physical gestures.

Movements of the navigation features of controller 750 may be echoed on a display (e.g., display 720) by movements of a pointer, cursor, focus ring, or other visual indicators displayed on the display. For example, under the control of software applications 716, the navigation features located on navigation controller 750 may be mapped to virtual navigation features displayed on user interface 722, for example. In embodiments, controller 750 may not be a separate component but integrated into platform 702 and/or display 720. Embodiments, however, are not limited to the elements or in the context shown or described herein.

In embodiments, drivers (not shown) may comprise technology to enable users to instantly turn on and off platform 702 like a television with the touch of a button after initial boot-up, when enabled, for example. Program logic may allow platform 702 to stream content to media adaptors or other content services device(s) 730 or content delivery device(s) 740 when the platform is turned "off." In addition, chip set 705 may comprise hardware and/or software support for 5.1 surround sound audio and/or high definition 7.1 surround sound audio, for example. Drivers may include a graphics driver for integrated graphics platforms. In embodiments, the graphics driver may comprise a peripheral component interconnect (PCI) Express graphics card.

In various embodiments, any one or more of the components shown in system 700 may be integrated. For example, platform 702 and content services device(s) 730 may be integrated, or platform 702 and content delivery device(s) 740 may be integrated, or platform 702, content services device(s) 730, and content delivery device(s) 740 may be integrated, for example. In various embodiments, platform 702 and display 720 may be an integrated unit. Display 720 and content service device(s) 730 may be integrated, or display 720 and content delivery device(s) 740 may be integrated, for example. These examples are not meant to limit the invention.

In various embodiments, system 700 may be implemented as a wireless system, a wired system, or a combination of both. When implemented as a wireless system, system 700 may include components and interfaces suitable for communicating over a wireless shared media, such as one or more antennas, transmitters, receivers, transceivers, amplifiers, filters, control logic, and so forth. An example of wireless shared media may include portions of a wireless spectrum, such as the RF spectrum and so forth. When implemented as a wired system, system 700 may include components and interfaces suitable for communicating over wired communications media, such as input/output (I/O) adapters, physical connectors to connect the I/O adapter with a corresponding wired communications medium, a network interface card (NIC), disc controller, video controller, audio controller, and so forth. Examples of wired communications media may include a wire, cable, metal leads, printed circuit board (PCB), backplane, switch fabric, semiconductor material, twisted-pair wire, co-axial cable, fiber optics, and so forth.

Platform 702 may establish one or more logical or physical channels to communicate information. The information may include media information and control information. Media information may refer to any data representing content meant for a user. Examples of content may include, for example, data from a voice conversation, videoconference, streaming video, electronic mail ("email") message, voice mail message, alphanumeric symbols, graphics, image, video, text and so forth. Data from a voice conversation may be, for example, speech information, silence periods, background noise, comfort noise, tones and so forth. Control information may refer to any data representing commands, instructions or control words meant for an automated system. For example, control information may be used to route media information through a system, or instruct a node to process the media information in a predetermined manner. The embodiments, however, are not limited to the elements or in the context shown or described in FIG. 6.

Figure 7:
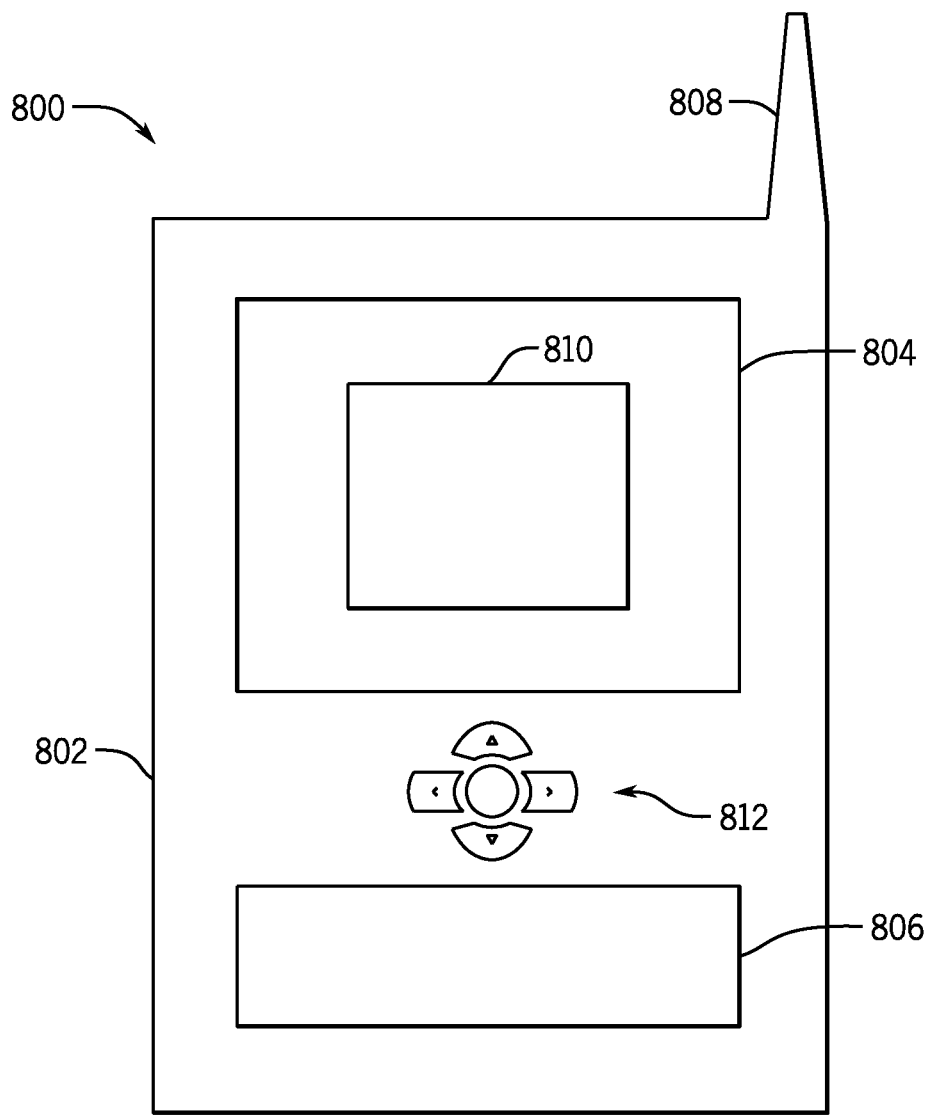
FIG. 7 is a front elevational view of one embodiment.

As described above, system 700 may be embodied in varying physical styles or form factors. FIG. 7 illustrates embodiments of a small form factor device 800 in which system 700 may be embodied. In embodiments, for example, device 800 may be implemented as a mobile computing device having wireless capabilities. A mobile computing device may refer to any device having a processing system and a mobile power source or supply, such as one or more batteries, for example.

As described above, examples of a mobile computing device may include a personal computer (PC), laptop computer, ultra-laptop computer, tablet, touch pad, portable computer, handheld computer, palmtop computer, personal digital assistant (PDA), cellular telephone, combination cellular telephone/PDA, television, smart device (e.g., smart phone, smart tablet or smart television), mobile internet device (MID), messaging device, data communication device, and so forth.

Examples of a mobile computing device also may include computers that are arranged to be worn by a person, such as a wrist computer, finger computer, ring computer, eyeglass computer, belt-clip computer, arm-band computer, shoe computers, clothing computers, and other wearable computers. In embodiments, for example, a mobile computing device may be implemented as a smart phone capable of executing computer applications, as well as voice communications and/or data communications. Although some embodiments may be described with a mobile computing device implemented as a smart phone by way of example, it may be appreciated that other embodiments may be implemented using other wireless mobile computing devices as well. The embodiments are not limited in this context.

The processor 710 may communicate with a camera 722 and a global positioning system sensor 720, in some embodiments. A memory 712, coupled to the processor 710, may store computer readable instructions for implementing the sequences shown in FIGS. 3 and 5 in software and/or firmware embodiments.

As shown in FIG. 7, device 800 may comprise a housing 802, a display 804, an input/output (I/O) device 806, and an antenna 808. Device 800 also may comprise navigation features 812. Display 804 may comprise any suitable display unit for displaying information appropriate for a mobile computing device. I/O device 806 may comprise any suitable I/O device for entering information into a mobile computing device. Examples for I/O device 806 may include an alphanumeric keyboard, a numeric keypad, a touch pad, input keys, buttons, switches, rocker switches, microphones, speakers, voice recognition device and software, and so forth. Information also may be entered into device 800 by way of microphone. Such information may be digitized by a voice recognition device. The embodiments are not limited in this context.

Various embodiments may be implemented using hardware elements, software elements, or a combination of both. Examples of hardware elements may include processors, microprocessors, circuits, circuit elements (e.g., transistors, resistors, capacitors, inductors, and so forth), integrated circuits, application specific integrated circuits (ASIC), programmable logic devices (PLD), digital signal processors (DSP), field programmable gate array (FPGA), logic gates, registers, semiconductor device, chips, microchips, chip sets, and so forth. Examples of software may include software components, programs, applications, computer programs, application programs, system programs, machine programs, operating system software, middleware, firmware, software modules, routines, subroutines, functions, methods, procedures, software interfaces, application program interfaces (API), instruction sets, computing code, computer code, code segments, computer code segments, words, values, symbols, or any combination thereof. Determining whether an embodiment is implemented using hardware elements and/or software elements may vary in accordance with any number of factors, such as desired computational rate, power levels, heat tolerances, processing cycle budget, input data rates, output data rates, memory resources, data bus speeds and other design or performance constraints.

The following clauses and/or examples pertain to further embodiments:

One example embodiment may be a method comprising storing a depth plane representation for fully covered tiles, and storing a depth plane representation for partially covered tiles at lower precision than for fully covered tiles stored at higher precision. The method may also include determining whether reconstructed depth values for partially covered tiles are the same as obtained with higher precision after rounding. The method may also include using bits saved through the lower precision representation to store a compressed coverage mask. The method may also include using bits saved through the lower precision representation to encode two planes overlapping a single tile. The method may also include storing signs, exponents and compressed per sample coverage mask. The method may also include encoding lower precision mantissa bits of a depth plane equation. The method may also include adapting the lower precision plane representation to make samples' depth values identical to the corresponding higher precision plane representation. The method may also include using a graphics processor to store a depth plane representation.

In another example embodiment may be at least one or more non-transitory computer readable media storing instructions executed by a processor to perform a sequence comprising storing a depth plane representation for tiles that are fully covered by a primitive, and storing a depth plane representation for partially covered tiles at lower precision than for fully covered tiles stored at higher precision. The media may include determining whether reconstructed depth values for partially covered tiles are the same as values with the higher precision representation after rounding. The media may include using bits saved through the lower precision representation to store a compressed coverage mask. The media may include using bits saved through the lower precision representation to encode two planes overlapping a single tile. The media may include storing signs, exponents and compressed per sample coverage mask. The media may include encoding lower precision mantissa bits of a depth plane equation. The media may include adapting the lower precision plane representation to make samples' depth values identical to the corresponding higher precision plane representation.

Another example embodiment may be an apparatus comprising a processor to store a depth plane representation for fully covered tiles and to store a depth plane representation for partially covered tiles at lower precision than for fully covered tiles stored at higher precision, and a memory coupled to said processor. The apparatus may include said processor to determine whether reconstructed depth values for partially covered tiles are the same as obtained with higher precision after rounding. The apparatus may include said processor to use bits saved through the lower precision representation to store a compressed coverage mask. The apparatus may include said processor to use bits saved through the lower precision representation to encode two planes overlapping a single tile. The apparatus may include said processor to store signs, exponents and compressed per sample coverage mask. The apparatus may include said processor to encode lower precision mantissa bits of a depth plane equation. The apparatus may include said processor to adapt the lower precision plane representation to make samples; depth values identical to the corresponding higher precision plane representation. The apparatus may include wherein said processor is a graphics processor. The apparatus may include a rasterizer. The apparatus may include a display communicatively coupled to the processor. The apparatus may include a battery coupled to the processor. The apparatus may include firmware and a module to update said firmware.

The graphics processing techniques described herein may be implemented in various hardware architectures. For example, graphics functionality may be integrated within a chipset. Alternatively, a discrete graphics processor may be used. As still another embodiment, the graphics functions may be implemented by a general purpose processor, including a multicore processor.

References throughout this specification to "one embodiment" or "an embodiment" mean that a particular feature, structure, or characteristic described in connection with the embodiment is included in at least one implementation encompassed within the present disclosure. Thus, appearances of the phrase "one embodiment" or "in an embodiment" are not necessarily referring to the same embodiment. Furthermore, the particular features, structures, or characteristics may be instituted in other suitable forms other than the particular embodiment illustrated and all such forms may be encompassed within the claims of the present application.

While a limited number of embodiments have been described, those skilled in the art will appreciate numerous modifications and variations therefrom. It is intended that the appended claims cover all such modifications and variations as fall within the true spirit and scope of this disclosure.

What is claimed is:

1. A method comprising:
   storing a depth plane representation for fully covered tiles;
   storing a depth plane representation for partially covered tiles at lower precision than for fully covered tiles stored at higher precision; and;
   using the depth plane representation to develop a depiction for display on a computer including a central processing unit.

2. The method of claim 1 including determining whether reconstructed depth values for partially covered tiles are the same as obtained with higher precision after rounding.

3. The method of claim 2 including using bits saved through the lower precision representation to store a compressed coverage mask.

4. The method of claim 3 including using bits saved through the lower precision representation to encode two planes overlapping a single tile.

5. The method of claim 3, including storing signs, exponents and compressed per sample coverage mask.

6. The method of claim 5, including encoding lower precision mantissa bits of a depth plane equation.

7. The method of claim 6, including adapting the lower precision plane representation to make samples' depth values identical to the corresponding higher precision plane representation.

8. The method of claim 1 including using a graphics processor to store a depth plane representation.

9. One or more non-transitory computer readable media storing instructions executed by a processor to perform a sequence comprising:
   storing a depth plane representation for tiles that are fully covered by a primitive; and
   storing a depth plane representation for partially covered tiles at lower precision than for fully covered tiles stored at higher precision.

10. The media of claim 9 including determining whether reconstructed depth values for partially covered tiles are the same as values with the higher precision representation after rounding.

11. The media of claim 10 including using bits saved through the lower precision representation to store a compressed coverage mask.

12. The media of claim 11 including using bits saved through the lower precision representation to encode two planes overlapping a single tile.

13. The media of claim 11, including storing signs, exponents and compressed per sample coverage mask.

14. The media of claim 13, including encoding lower precision mantissa bits of a depth plane equation.

15. The media of claim 14, including adapting the lower precision plane representation to make samples' depth values identical to the corresponding higher precision plane representation.

16. An apparatus comprising:
   a processor to store a depth plane representation for fully covered tiles and to store a depth plane representation for partially covered tiles at lower precision than for fully covered tiles stored at higher precision; and
   a memory coupled to said processor.

17. The apparatus of claim 16, said processor to determine whether reconstructed depth values for partially covered tiles are the same as obtained with higher precision after rounding.

18. The apparatus of claim 17, said processor to use bits saved through the lower precision representation to store a compressed coverage mask.

19. The apparatus of claim 18, said processor to use bits saved through the lower precision representation to encode two planes overlapping a single tile.

20. The apparatus of claim 18, said processor to store signs, exponents and compressed per sample coverage mask.

21. The apparatus of claim 20, said processor to encode lower precision mantissa bits of a depth plane equation.

22. The apparatus of claim 21, said processor to adapt the lower precision plane representation to make samples; depth values identical to the corresponding higher precision plane representation.

23. The apparatus of claim 16 wherein said processor is a graphics processor.

24. The apparatus of claim 23 including a rasterizer.

25. The apparatus of claim 16 including a display communicatively coupled to the processor.

26. The apparatus of claim 16 including a battery coupled to the processor.

27. The apparatus of claim 16 including firmware and a module to update said firmware.

* * * * *